United States Patent [19]

Suzuki

[11] Patent Number: 5,541,508
[45] Date of Patent: Jul. 30, 1996

[54] POSITION DETECTOR FOR SYNCHRONIZING OPERATION OF A RECORDING DEVICE WITH THAT OF A CARRIAGE IN A RECORDING APPARATUS

[75] Inventor: Noriyuki Suzuki, Tokyo, Japan

[73] Assignee: Canon Kabushiki Kaisha, Tokyo, Japan

[21] Appl. No.: 229,589

[22] Filed: Apr. 19, 1994

[30] Foreign Application Priority Data

Apr. 28, 1993 [JP] Japan .................................. 5-125327

[51] Int. Cl.$^6$ .............................. G01B 7/14; G01D 1/14
[52] U.S. Cl. ................. 324/207.21; 364/571.02
[58] Field of Search .................... 324/207.21, 207.20, 324/207.23–207.26, 235, 252, 260, 262, 166, 173, 174; 364/582, 571.02, 561, 562; 338/32 R, 32 H

[56] References Cited

U.S. PATENT DOCUMENTS

| | | | |
|---|---|---|---|
| 4,761,608 | 8/1988 | Franklin et al. | 324/207.24 X |
| 4,902,970 | 2/1990 | Suquet | 324/207.25 X |
| 4,908,527 | 3/1990 | Van Antwerp | 324/235 X |
| 5,047,716 | 9/1991 | Katagiri | 324/207.21 |
| 5,239,490 | 8/1993 | Masaki et al. | 324/163 X |

FOREIGN PATENT DOCUMENTS 0419041  3/1991  European Pat. Off. .
0439912  3/1991  European Pat. Off. .

OTHER PUBLICATIONS

Easton, "Pressure Measurement Using 'Smart' Transducers," Advances in Instrumentation, vol. 40, Part 2, Oct. 1985, pp. 1153 through 1165.

Primary Examiner—Sandra L. O'Shea
Assistant Examiner—Roger Phillips
Attorney, Agent, or Firm—Fitzpatrick, Cella, Harper & Scinto

[57] ABSTRACT

A position detector includes a magnetic recording medium on which a prescribed magnetic pattern has been formed, a magnetoresistive element the amplitude value of which varies in response to the magnetic pattern, an amplifier for amplifying the output of the magnetoresistive element, the offset voltage of the amplifier output being variable, and an output observing element for observing the output of the amplifier. The offset voltage of the amplifier is set based upon the results of observation provided by the output observing element. Adjustment of the offset voltage is thus set automatically.

10 Claims, 6 Drawing Sheets

POSITION DETECTOR FOR SYNCHRONIZING OPERATION OF A RECORDING DEVICE WITH THAT OF A CARRIAGE IN A RECORDING APPARATUS

BACKGROUND OF THE INVENTION

1. Field of the Invention

This invention relates to a position detector and, more particularly, to a position detector which, by means of a linear encoder composed of a scale portion on which a magnetic pattern has been recorded and a detector portion (magnetic head) comprising a magnetoresistive element that is moved along the scale portion to detect the magnetic pattern, is used for detecting the position of, say, a carriage (e.g., a carriage carrying the printing head of a serial printer) on which the magnetic head is mounted. Since the position detector of the present invention preferably is applied to detection of carriage position, as set forth above, the invention is described in relation to improvements in a carriage position detector used heretofore. It should be noted, however, that the invention is not limited to such an application.

2. Description of the Related Art

Figure 6:
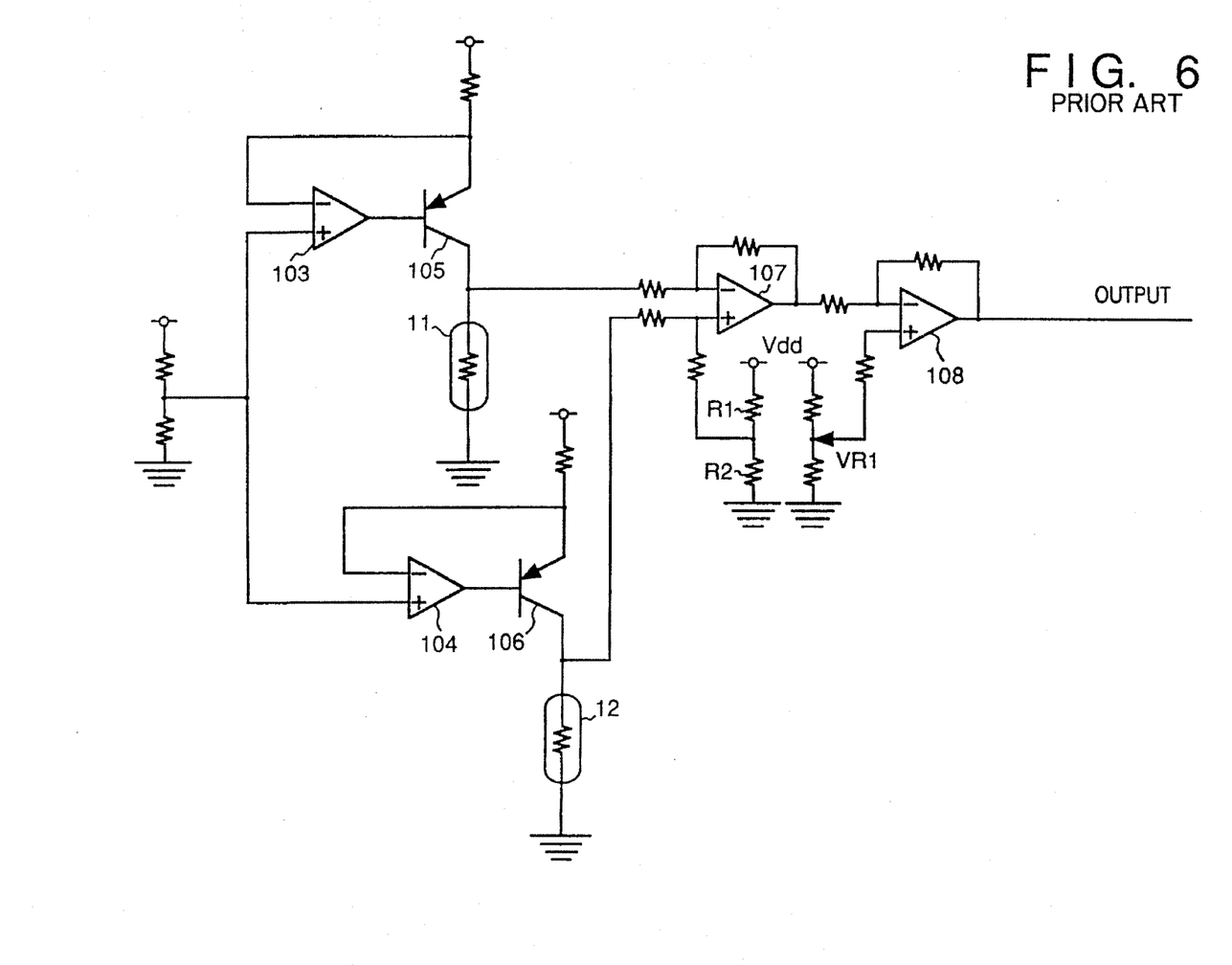
FIG. 6 is a circuit diagram of a position detector according to the prior art.

FIG. 6 illustrates a prior art example of a device for detecting the position of a carriage in a serial printer. The position detector includes MR elements (magnetoresistive elements) 11, 12 for reading a magnetic pattern formed on a magnetic recording medium (not shown). The arrangement is such that a constant current is supplied to these elements by operational amplifiers 103, 104 and transistors 105, 106. A differential amplifier 107 amplifies the difference between the outputs of the MR elements 11, 12 at a prescribed amplification factor. Since the outputs of the MR elements are 180° out of phase, the result of amplification by the differential amplifier 107 is a pseudo-sinusoidal signal output that resembles a sine wave. An inverting amplifier 108 amplifies the output of the differential amplifier 107 to a prescribed magnitude.

The +input terminals of the amplifiers 107 and 108 are biased to prescribed values by resistors R1, R2 of identical resistance and a variable resistor VR1, respectively.

The magnitude of the offset voltage of the output from the inverting amplifier 108 preferably is one-half the power-supply voltage, i.e., ½Vdd, in order that the maximum amplitude voltage of the inverting amplifier 108 may be utilized effectively, i.e., in order that the dynamic range will not be reduced. However, owing to a variance in the difference between the resistance values of the MR elements 11, 12 and in the input offset voltages possessed by the operational amplifying elements used in the differential amplifier 107 and inverting amplifier 108, the offset voltage of the inverting amplifier 108 differs for each circuit. Accordingly, a process for regulating the variable resistor VR1 is essential in the prior art.

Further, the amplitude value of the output of inverting amplifier 108 also differs somewhat from one circuit to another owing to a variance in the difference between the resistance values of the MR elements 11, 12 and in sensor sensitivity. The output of this circuit is converted into a pulse signal by a comparator, which is the next stage. In order to obtain a stable pulse signal, it is undesirable if the amplitude value of the circuit output is too large or too small.

Accordingly, in the prior art, difficulties caused by the aforementioned individual differences from one circuit to another are avoided by using MR elements suited to the prescribed output range. As a result, this has significant effects at the time of mass production of the MR elements and is an impediment to a reduction in the cost of the manufactured item.

SUMMARY OF THE INVENTION

Accordingly, an object of the present invention is to provide a position detector in which an adjustment of offset voltage is made unnecessary and amplifier dynamic range is capable of being utilized to the maximum extent.

Another object of the present invention is to provide a position detector capable of dealing flexibly with a variance in the output of an MR element.

A further object of the present invention is to provide a position detector in which an adjustment of offset voltage is made unnecessary, an amplifier dynamic range is capable of being utilized to the maximum extent and variance in the output of an MR element is capable of being dealt with in a flexible manner, the position detector being particularly suited to a serial printer having a carriage on which MR elements are mounted.

According to the present invention, the foregoing objects are attained by providing a position detector comprising a magnetic recording medium on which a prescribed magnetic pattern has been formed, a magnetoresistive element having an amplitude value which varies in response to the magnetic pattern, an amplifier for amplifying an output of the magnetoresistive element, the offset voltage of the amplifier output being variable, and output observing means for observing the output of the amplifier, the offset voltage of the amplifier being set based upon the results of observation obtained from the output observing means.

The position detector further comprises constant-current supply means capable of supplying the magnetoresistive element with a constant current at a variable level.

More specifically, the present invention provides a position detector comprising a magnetic recording medium on which a magnetic pattern, on which recording is performed at a prescribed pitch, is formed in a longitudinal direction, a magnetoresistive element, which is arranged so as to move along the magnetic pattern, the resistance value of which varies depending upon reading of the magnetic pattern, signal generating means for generating an electrical signal that conforms to the variation in the resistance value of the magnetoresistive element, an amplifier for amplifying and outputting the electrical signal from the signal generating means and varying an offset voltage of its amplified output, output observing means for observing the amplified output of the amplifier, and adjusting means for adjusting the offset voltage based upon the result, obtained from the output observing means, of observing the amplified output. As a result, by making it possible to automatically set the adjustment of the offset voltage, adjustment is no longer required. In addition, the dynamic range of the amplifier can be utilized to the maximum extent and it is possible to deal flexibly with a variance in the characteristics of the magnetoresistive element.

In a preferred embodiment, the present invention provides a position detector comprising a magnetic recording medium on which a magnetic pattern, on which recording is performed at a prescribed pitch, is formed in a longitudinal direction, a magnetoresistive element, which is arranged so as to move along the magnetic pattern, the resistance value of which varies depending upon reading of the magnetic pattern, a constant-current circuit for supplying the magnetoresistive element with a constant current, an amplifier for amplifying the constant current and delivering its amplified output to the outside, the amplifier having an input terminal for varying an offset voltage of the amplified output signal, sampling means for sampling the output of the amplifier, an A/D converter for A/D-converting a value sampled by the sampling means, a controller, to which an output value from the A/D converter is applied as an input, for calculating at least the offset voltage of the amplified output signal of the amplifier from the output value of the A/D converter, and setting an offset voltage value corresponding to a desired offset voltage, and a D/A converter for D/A-converting the offset voltage value set by the controller and outputting the converted offset voltage value to the input terminal of the amplifier.

In another preferred embodiment, the present invention provides a position detector comprising a magnetic recording medium on which a magnetic pattern, on which recording is performed at a prescribed pitch, is formed in a longitudinal direction, first and second magnetoresistive elements, which are arranged so as to move along the magnetic pattern, the resistance values of which vary depending upon reading of the magnetic pattern, a differential amplifier, to which the first and second magnetoresistive elements are connected, for differentially amplifying and outputting an electric signal that conforms to a variation in each resistance value of each of the magnetoresistive elements, and varying an offset voltage of its amplified output, output observing means for observing the amplified output of the differential amplifier, and adjusting means for adjusting the offset voltage based upon the result, obtained from the output observing means, of observing the amplified output.

In still another embodiment, the present invention provides a position detector for a recording apparatus for reciprocating a recording means relative to a recording medium and performing prescribed recording by the recording means while establishing synchronization with the reciprocating operation, comprising a magnetic recording medium on which a magnetic pattern, on which recording is performed at a pitch corresponding to the prescribed recording, is formed in a longitudinal direction, and which is arranged along the direction of reciprocation, a magnetoresistive element, which is reciprocated together with the recording means, the resistance value of which varies depending upon reading of the magnetic pattern, signal generating means for generating an electrical signal that conforms to the variation in resistance value of the magnetoresistive element, an amplifier for amplifying and outputting the electrical signal from the signal generating means and varying an offset voltage of its amplified output, output observing means for observing the amplified output of the amplifier, and adjusting means for adjusting the offset voltage based upon the result, obtained from the output observing means, of observing the amplified output.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
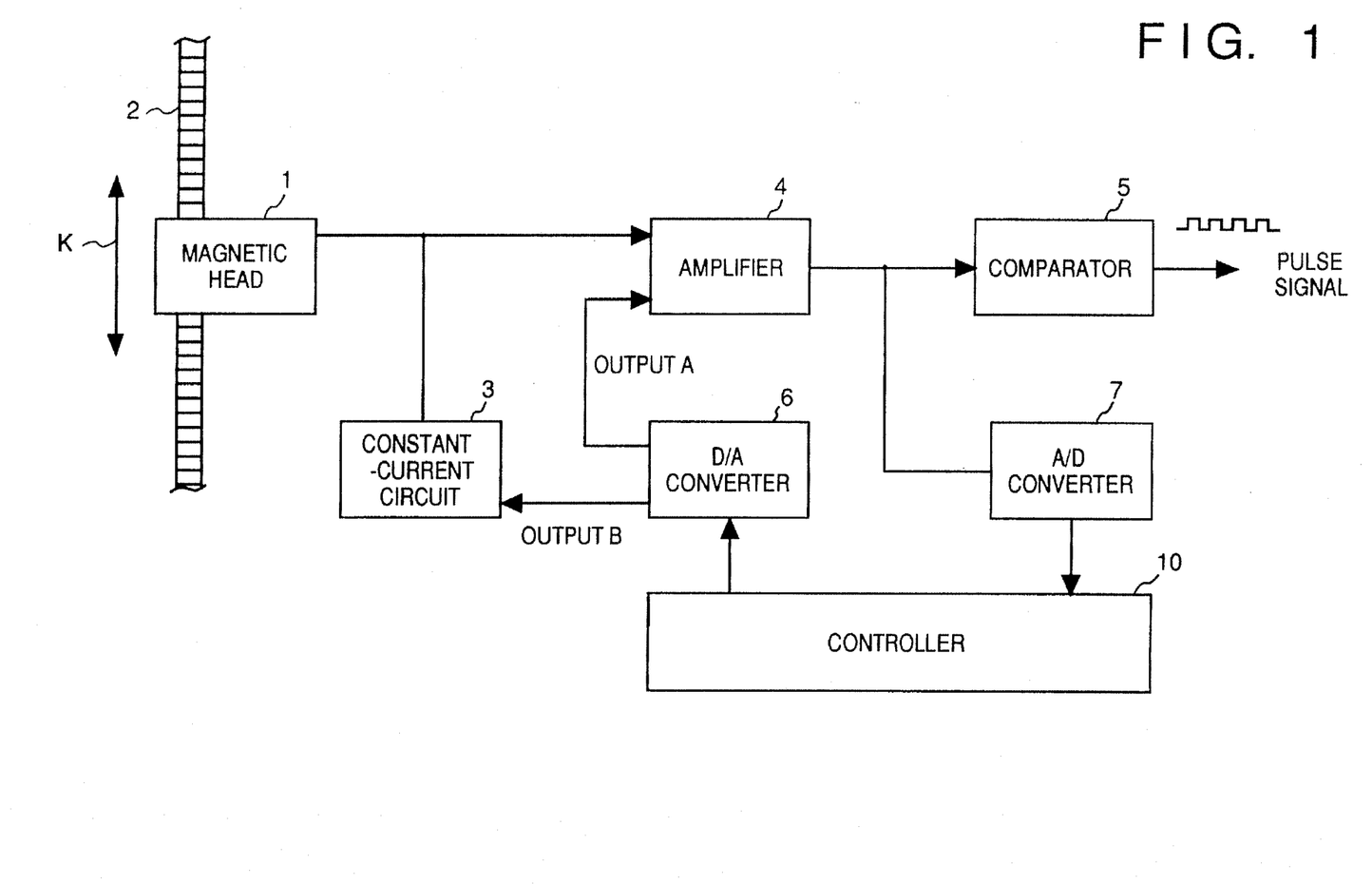
FIG. 1 is a block diagram illustrating an embodiment of a position detector according to the present invention.

An embodiment of the present invention will now be described in detail. FIG. 1 is a block diagram illustrating an embodiment of a position detector according to the present invention. The position detector includes a magnetic head 1 comprising such components as an MR (magnetoresistive) element. The magnetic head 1 is brought into contact with a magnetic recording medium 2 magnetized at equal intervals in the longitudinal direction of a bar member, for example, and outputs an electrical signal by being moved relative to the recording medium 2 in the direction of arrow K while the aforementioned contact is maintained. As will be described later, the magnetic head may be provided with two MR elements, namely first and second MR elements, or may be constructed as a single MR element, as illustrated.

A constant-current circuit 3 is connected to the magnetic head 1 and supplies the magnetic head 1 with a prescribed current based upon the output voltage B of a D/A converter 6, and is connected to an amplifier 4 that amplifies the output signal of the magnetic 1 to a prescribed magnitude. The amplifier 4 is adapted to vary the offset voltage of its output based upon an output voltage A from the D/A converter 6, described below. A comparator 5 changes the output signal of the amplifier 4 to a pulse signal. A controller 10 comprises a CPU, a ROM·RAM and an I/O port circuit. The I/O port is used for input and output with respect to the D/A converter 6 and an A/D converter 7. On the basis of a command from the controller 10, the D/A converter 6 outputs set voltages that decide the current value of the constant-current circuit 3 and the offset voltage of the amplifier 4. The A/D converter 7 converts the analog output signal of the amplifier 4 to a digital signal and transmits the signal to the controller 10 as digital information.

Figure 2:
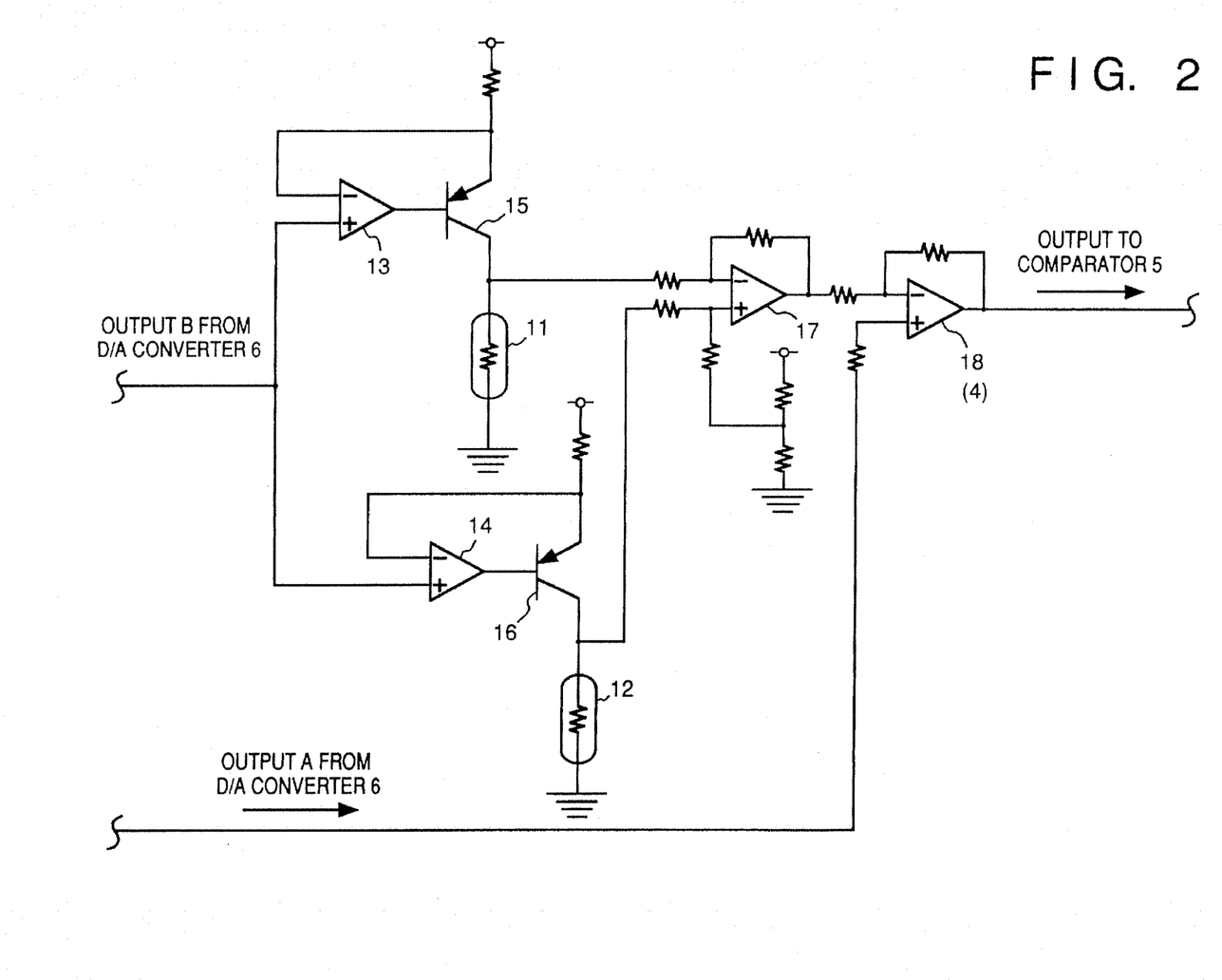
FIG. 2 is a detailed circuit diagram showing the position detector of FIG. 1.

As shown in FIG. 2, a first MR element 11 and a second MR element 12 are connected to construct an arrangement corresponding to the magnetic head 1 of FIG. 1. Numerals 13, 14 denote operational amplifiers, and 15, 16 designate transistors. These correspond to the constant-current circuit 3 shown in FIG. 1. Numeral 17 denotes a differential amplifier and 18 an inverting amplifier. These correspond to the amplifier 4 in FIG. 1.

The elements 11–18 used may correspond to the elements 103, 104, 105, 106, 107, 108 of the conventional arrangement shown in FIG. 6. What distinguishes the arrangement of the present invention from that of the prior art example may be summarized as follows, with reference to FIG. 2:

(1) The output voltage A of the D/A converter 6, and not a voltage divided by a variable resistor, is connected to the+input terminal (the non-inverting input terminal) of the inverting amplifier 18.

(2) The output voltage B of the D/A converter 6, and not a voltage divided by a resistor as in the prior art, is connected to the +input terminal of the operational amplifiers 13 and 15.

Control performed by the controller 10 will now be described with reference to both FIGS. 1 and 2.

First, the controller 10 sets the offset voltage of the amplifier 4 and the current value of the constant-current circuit 3 to appropriate initial values by the outputs A, B of the D/A converter 6. The output signal from the amplifier 4 is observed via the A/D converter 7.

Figure 3:
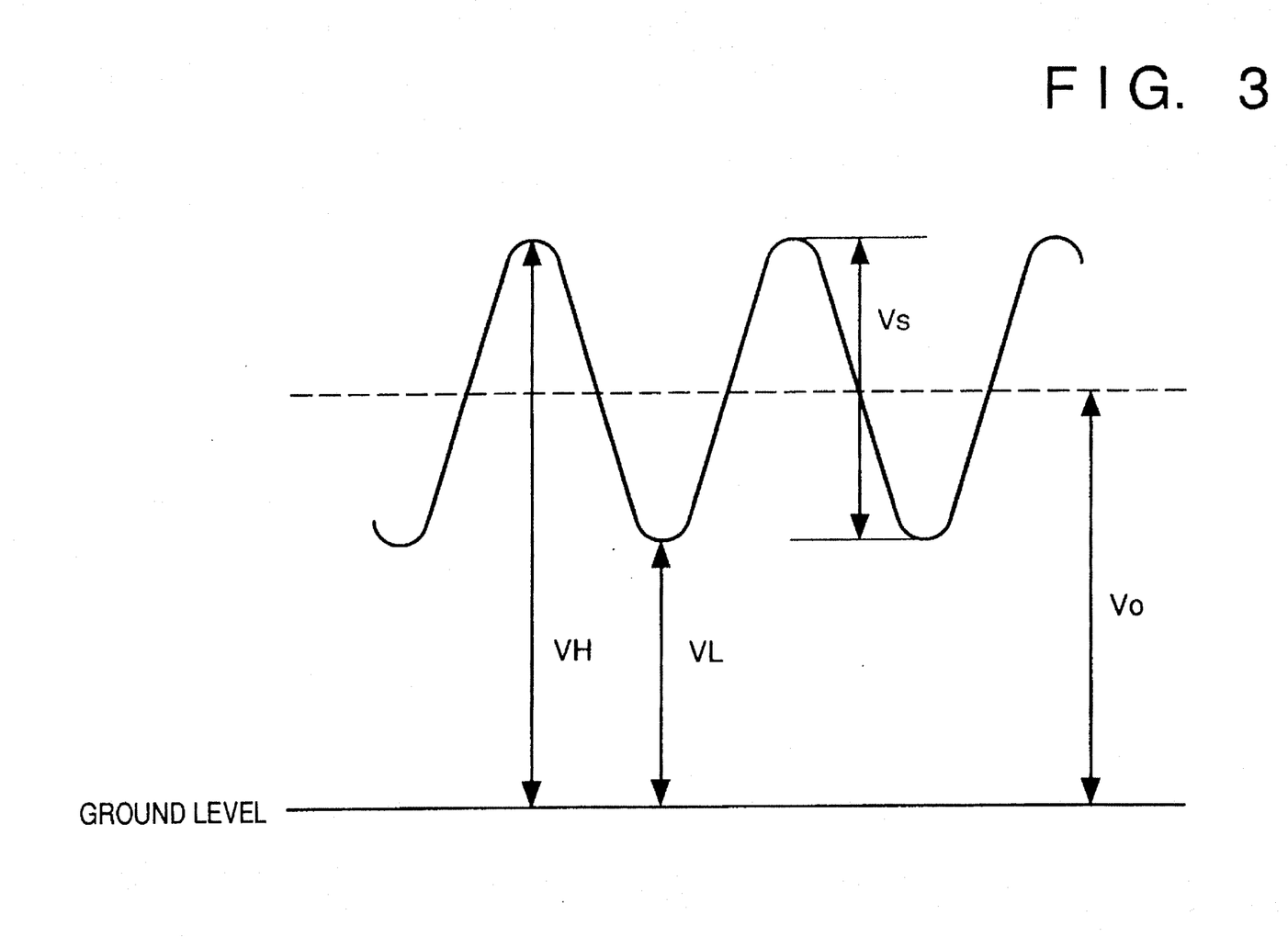
FIG. 3 is a diagram showing the output signal of the position detector.

FIG. 3 is a waveform diagram showing the output signal monitored via the A/D converter 7. In FIG. 3, $V_H$, $V_L$, $V_S$ and $V_O$ represent maximum value, minimum value, amplitude value and offset voltage, respectively. Though $V_H$ and $V_L$ can be monitored using a peak-hold circuit or the like, a more simple arrangement is to sample the output signal a number of times by the A/D converter 7, whereby the maximum and minimum values can be obtained. Further, $V_O$ can be obtained from the average of $V_H$ and $V_L$ or from the average of all sampled values. Similarly, $V_S$ can be obtained from the difference between $V_H$ and $V_L$.

The output voltage A of the D/A converter 6 is raised if $V_O$ is greater than a stipulated value and lowered if $V_O$ is less than the stipulated value. Thus, adjustment is performed in such a manner that $V_O$ becomes the stipulated value. Similarly, with regard to $V_S$, the output voltage 2 of the D/A converter 604 is raised or lowered to increase or decrease the current value in such a manner that $V_S$ will attain a stipulated value. It should be noted that the stipulated value of $V_S$ is selected to be a value that will allow the dynamic range of the amplifier to be utilized to the maximum extent.

Figure 4:
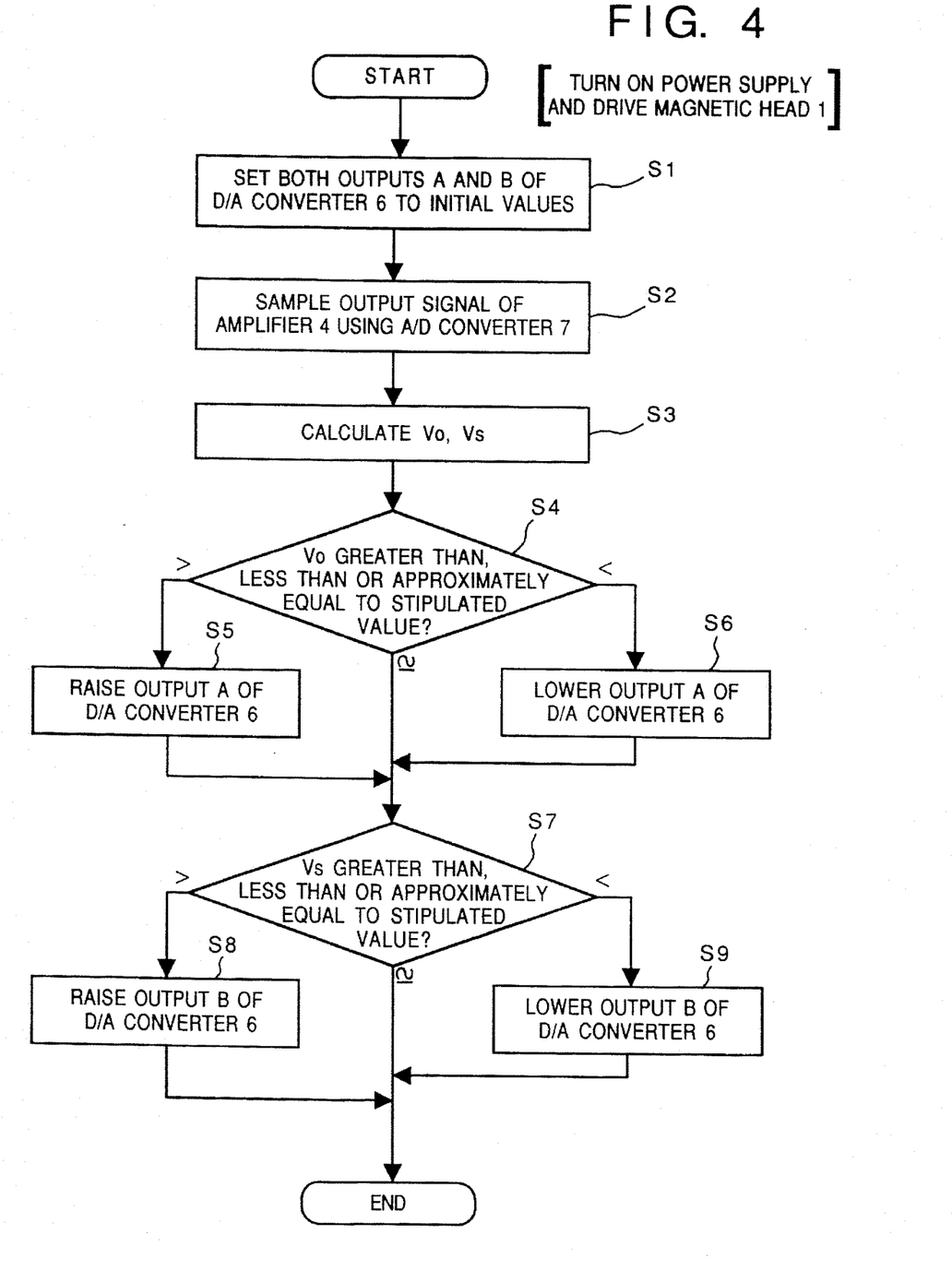
FIG. 4 is a flowchart showing an example of control of the position detector.

FIG. 4 is a flowchart illustrating the control described above. When power is introduced to the apparatus to drive the magnetic head, the output voltages A, B of the D/A converter 6 are set to suitable initial values (step S1). Next, the output signal of the amplifier 4 is sampled by the A/D converter 7 (step S2). On the basis of the value obtained by this sampling operation, $V_O$ and $V_S$ are obtained by calculation, as described above (step S3). Next, it is determined whether the value of $V_O$ is greater than, less than or approximately equal to a stipulated value (step S4). If the value of $V_O$ is greater than the stipulated value, the output A of the D/A converter 6 is raised (step S5). If the value of $V_O$ is less than the stipulated value, the output A of the D/A converter 6 is lowered (step S6). If the value of $V_O$ is approximately equal to the stipulated value, then the program proceeds to step S7. Here it is determined whether $V_S$ is greater than, less than or approximately equal to a stipulated value. If the value of $V_S$ is greater than the stipulated value, the output B of the D/A converter 6 is raised (step S8). If the value of $V_S$ is less than the stipulated value, the output B of the D/A converter 6 is lowered (step S9). More reliable results can be obtained by repeatedly executing the processing of steps S2~S9.

In accordance with the foregoing embodiment as described above, it is possible to obtain an excellent position detector wherein the need to adjust the offset voltage, which is necessary in the prior art, can be eliminated by a setting performed automatically on the side of the apparatus. In addition, the position detector obtained makes it possible to utilize the dynamic range of the amplifier to the maximum extent.

Furthermore, in a case where the current value of the constant current also is adjusted, it is possible to deal flexibly with a variance in the output of the MR sensors.

Figure 5:
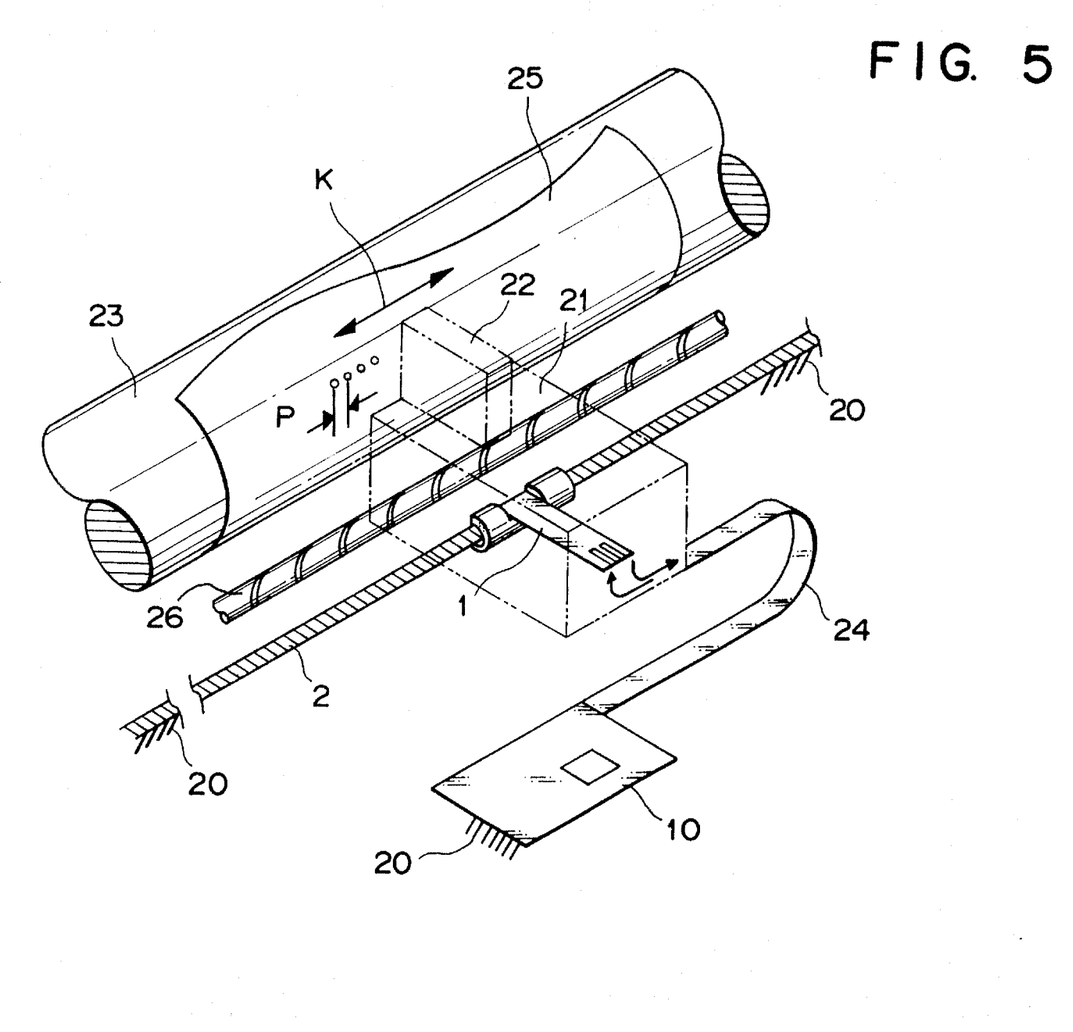
FIG. 5 is an external perspective view showing an example in which the position detector is applied to a serial printer.

FIG. 5 is an external perspective view showing an example in which the position detector is applied to a serial printer. As shown in FIG. 5, the printer includes a carriage 21, which is indicated by the dashed line, that moves in the direction of arrow K as a feed screw 26 rotates. Carried on the carriage 21 is a recording head 22 which, while being moved in the direction of arrow K, records dots at a prescribed pitch P on paper 25 wound upon the outer peripheral surface of a platen 23. This is a serial recording operation of a so-called serial recording printing system. In order to carry out this recording operation, it is required that the movement of the carriage 21 and the recording operation of the recording head 22 (e.g., an ink jetting operation in an ink-jet recording system) be synchronized accurately.

Accordingly, a magnetic recording medium 2, on which a magnetic pattern has been formed by magnetization at equal intervals in the longitudinal direction, is provided on a base 20 of the printer so as to lie parallel to the feed screw 26. The magnetic head 1, which is moved in the direction of arrow K while in contact with the magnetic pattern on the magnetic recording medium 2, is provided on the carriage 21. The magnetic head 1 is connected to the controller 10 of the position detector, which is secured to the base 20, via a flexible cable 24 that flexes as the carriage 21 moves.

If the offset voltage in the above arrangement is adjusted when, say, the manufactured product is shipped, the adjustment is performed automatically, in the manner described above, as the carriage 21 is driven. This makes it possible to eliminate the adjustment time necessary at the time of shipping of the conventional printer. In addition, it is possible to utilize the amplifier dynamic range to the maximum extent. In a case where two MR elements, namely the first and second MR elements, are provided, use is possible even if there is some variance in the characteristics of the individual elements.

It should be noted that the present invention is not limited to the illustrated embodiment but can be modified in various ways. The invention is applicable to devices other than serial printers. That is, the invention is broadly applicable to devices requiring accurate positioning in the driving operation. Such devices include an XY plotter in which a recording head travels in longitudinal and transverse directions, and a pen recorder in which recording is performed by a pen while the pen is moved at high speed.

As many apparently widely different embodiments of the present invention can be made without departing from the spirit and scope thereof, it is to be understood that the invention is not limited to the specific embodiments thereof except as defined in the appended claims.

What is claimed is:

1. A position detector for a recording apparatus, said position detector comprising:

a carriage which is reciprocally moved for a recording operation;

recording means, carried on said carriage, for performing a recording operation in synchronization with the movement of said carriage;

a magnetic recording medium on which a magnetic pattern, recorded at a prescribed pitch, is formed in a longitudinal direction;

a magnetoresistive element arranged so as to move along the magnetic pattern and having a resistance value which varies depending upon reading of the magnetic pattern;

a constant-current circuit for passing a constant current through said magnetoresistive element;

an amplifier for amplifying the constant current and delivering an amplified output signal externally of said apparatus, said amplifier having an output terminal for varying an offset voltage of the amplified output signal;

sampling means for sampling the amplified output signal of said amplifier;

an A/D converter for A/D-converting a signal sampled by said sampling means and for producing an output value;

a controller, to which an output value from said A/D converter is applied as an input, for calculating at least the offset voltage of the amplified output signal of said amplifier from the output value of said A/D converter, and setting an offset voltage corresponding to a desired offset voltage;

a D/A converter for D/A-converting the offset voltage value set by said controller and outputting the converted offset voltage value to an input terminal of said amplifier; and pulse generating means for generating a pulse output signal based on the amplified output signal, which is used to synchronize the recording operation of said recording means with respect to the movement of said carriage.

2. A position detector according to claim 1, wherein said controller calculates the amplitude of the amplified output signal of said amplifier from an output value of said D/A converter and sets an amplitude value corresponding to a desired value, the amplitude value being inputted to an input terminal of said constant-current circuit.

3. A position detector for recording apparatus for reciprocating a recording means relative to a recording medium and performing a prescribed recording operation by the recording means while establishing synchronization with relative reciprocation of the recording means, said position detector comprising:

a carriage which is reciprocally moved for a recording operation;

recording means, carried on said carriage, for performing a recording operation in synchronization with the movement of said carriage;

pulse generating means for generating a pulse output signal which is used to synchronize the recording operation of said recording means with respect to the movement of said carriage;

a magnetic recording medium on which a magnetic pattern, recorded at a pitch corresponding to the prescribed recording operation, said magnetic recording medium being arranged along the direction of reciprocation of said carriage;

first and second magnetoresistive elements carried on said carriage and arranged so as to be reciprocated along the magnetic pattern and having resistance values which vary depending upon reading of the magnetic pattern;

a differential amplifier, to which said first and second magnetoresistive elements are connected, for amplifying a difference between electrical signals that conform to variations in resistance values of respective ones of said magnetoresistive elements, producing an amplified output signal indicative of the amplified difference and varying an offset voltage of the amplified output signal and supplying the amplified signal to said pulse generating means;

output observing means for observing the amplified output signal of said differential amplifier and producing a signal indicative of the result; and adjusting means for adjusting the offset voltage based upon the result, obtained from said output observing means, of observing the amplified output signal.

4. The position detector according to claim 3, further comprising:

constant-current supply means for supplying each of said magnetoresistive elements with a constant current, the value of the supplied constant current being variable; and adjusting means for adjusting the offset voltage by adjusting the constant current, which is supplied from said constant-current supply means to each magnetoresistive element, based upon the result, obtained from the output observing means, of observing the amplified output signal of said differential amplifier.

5. The position detector according to claim 3, wherein said output observing means comprises:

sampling means for sampling the amplified output of said differential amplifier, thereby detecting a maximum value and a minimum value of the amplified output and outputting a detection result; and amplitude calculating means for calculating the amplitude of the amplified output of said differential amplifier from the maximum value and minimum value;

said position detector further comprising amplitude regulating means for regulating the amplitude of the amplified output of said differential amplifier by adjusting a supply of current from said constant-current supply means depending upon the amplitude calculated by said amplitude calculating means.

6. A position detector for a recording apparatus for reciprocating a recording means relative to a recording medium and performing a prescribed recording operation by the recording means while establishing synchronization with relative reciprocation of the recording means, said position detector comprising:

a carriage which is reciprocally moved for recording operation;

recording means, carried on said carriage, for performing a recording operation in synchronization with the movement of said carriage;

pulse generating means for generating a pulse output signal, which is used to synchronize the recording operation of said recording means with respect to the movement of said carriage;

a magnetic recording medium on which a magnetic pattern, recorded at a pitch corresponding to the prescribed recording operation, is formed in a longitudinal direction, said magnetic recording medium being arranged along the direction of reciprocation of said carriage;

a magnetoresistive element reciprocated together with said carriage and having a resistance value which varies depending upon reading of the magnetic pattern;

signal generating means for generating an electrical signal that conforms to the variation in the resistance value of said magnetoresistive element;

an amplifier for amplifying the electrical signal from said signal generating means, outputting the amplified signal and varying an offset voltage of this amplified output and supplying the amplified signal to said pulse generating means;

output observing means for observing the amplified output of said amplifier and producing a signal indicative of the result; and adjusting means for adjusting the offset voltage based upon the result, obtained from said output observing means, of observing the amplified output.

7. The position detector according to claim 6, further comprising:

constant-current supply means for supplying said magnetoresistive element with a constant current, the value of the supplied constant current being variable; and adjusting means for adjusting the offset voltage by adjusting the constant current, which is supplied from said constant-current supply means to said magnetoresistive element, based upon the result, obtained from the output observing means, of observing the amplified output.

8. The position detector according to claim 6, wherein said output observing means comprises:

sampling means for sampling the amplified output of said amplifier, thereby detecting a maximum value and a minimum value of the amplified output and outputting a detection result; and calculating means for calculating the offset voltage of said amplifier based upon the result of the detection from said sampling means;

said position detector further comprising adjusting means for adjusting the offset voltage of said amplifier depending upon the offset voltage calculated by said calculating means.

9. The position detector according to claim 6 wherein said output observing means comprises:

sampling means for sampling the amplified output of said amplifier, thereby detecting a maximum value and a minimum value of said amplified output and outputting a result of the detection; and amplitude calculating means for calculating the amplitude of the amplified output of said amplifier from the maximum value and minimum value;

said position detector further comprising amplitude regulating means for regulating the amplitude of the amplified output of said amplifier by adjusting a supply of current from said constant-current supply means depending upon the amplitude calculated by said amplitude calculating means.

10. A position detector for a recording apparatus, said position detector comprising:

a carriage which is reciprocally moved for a recording operation;

recording medium, carried on said carriage, for performing a recording operation in synchronization with the movement of said carriage;

a magnetic recording medium on which a magnetic pattern, recorded at a prescribed pitch, is formed in a longitudinal direction along the movement of said carriage;

detecting means carried on said carriage and arranged so as to move along the magnetic pattern and having a resistance value which varies depending upon reading of the magnetic pattern;

signal generating means for generating an electrical signal that conforms to the variation in the resistance value of said detecting means;

an amplifier for amplifying the electrical signal generated by said signal generating means, outputting the amplified signal and varying an offset voltage of the amplified output;

output observing means for observing the amplified output of said amplifier and producing a signal indicative of the result;

adjusting means for adjusting the offset voltage based upon the result, obtained from said output observing means, of observing the amplified output; and pulse generating means for generating a pulse output signal based on the amplified output signal, which is used to synchronize the recording operation of said recording means with respect to the movement of said carriage.

* * * * *

UNITED STATES PATENT AND TRADEMARK OFFICE
CERTIFICATE OF CORRECTION

PATENT NO. : 5,541,508
DATED : July 30, 1996
INVENTOR(S) : NORIYUKI SUZUKI

It is certified that error appears in the above-indentified patent and that said Letters Patent is hereby corrected as shown below:

ON THE COVER PAGE:

Under "FOREIGN PATENT DOCUMENTS," item [56]

"0439912 3/1991 European Pat. Off."

should read:

--0439912 8/1991 European Pat. Off.--.

IN THE DISCLOSURE:

COLUMN 4:

Line 62, "the+input" should read --the + input--.

COLUMN 7:

Line 8, "voltage" should read --voltage value--.

UNITED STATES PATENT AND TRADEMARK OFFICE
CERTIFICATE OF CORRECTION

PATENT NO. : 5,541,508
DATED : July 30, 1996
INVENTOR(S) : NORIYUKI SUZUKI

It is certified that error appears in the above-indentified patent and that said Letters Patent is hereby corrected as shown below:

COLUMN 9:

Line 20, "claim 6" should read --claim 6,--.

Signed and Sealed this

Fourth Day of February, 1997

Attest:

BRUCE LEHMAN

Attesting Officer    Commissioner of Patents and Trademarks